US005797216A

United States Patent [19]

Reznik

[11] Patent Number: 5,797,216

[45] Date of Patent: Aug. 25, 1998

[54] APPARATUS AND METHODS FOR REDUCING THE REDOX POTENTIAL OF SUBSTANCES

[76] Inventor: David Reznik, 1231 Loquat Ave., Patterson, Calif. 95363

[21] Appl. No.: 441,636

[22] Filed: May 15, 1995

Related U.S. Application Data

[63] Continuation of Ser. No. 121,264, Sep. 13, 1993, abandoned.

[51] Int. Cl.[6] .................... A01B 79/00

[52] U.S. Cl. .................... 47/58; 239/723; 210/757; 405/36

[58] Field of Search .................... 62/78; 422/28; 210/757; 423/580.1; 47/1.01, 58, DIG. 10, 1.4 NU, 59, 62 N, 58.01, 58.09, 58.1, 58.27; 239/723; 405/36

[56] References Cited

U.S. PATENT DOCUMENTS

| | | | |
|---|---|---|---|
| 4,159,309 | 6/1979 | Faul et al. | 423/53 |
| 4,676,878 | 6/1987 | Chez | 204/101 |
| 4,836,929 | 6/1989 | Baumann et al. | 210/638 |
| 5,403,450 | 4/1995 | Mellor et al. | 210/632 |

OTHER PUBLICATIONS

M.S. Kurzer "*Planning and Interpreting 'Designer Food' Feeding Studies*", Food Technology, Apr. 1993, pp. 80–84.

J.E. Kinsella, E. Frankel, B. German & J. Kanner, "*Possible Mechanisms for the Protective Role of Antioxidants in Wine and Plant Foods*", Food Technology, Apr. 1993, pp. 85–89.

N. Anglier, "*The Price we Pay for Breathing*", The New York Times Magazine/Apr. 25, 1993.

Kihm, D.J., et al., Hydrogen gas accelerates thermal inactivation of Clostridium botulinum 113B spores, *Applied Microbiology and Biotechnology*., (1990) 33:705–708.

*Primary Examiner*—Robert Popovics

*Attorney, Agent, or Firm*—Darby & Darby

[57] ABSTRACT

A method for improving water quality including the steps of providing a supply of water to be treated and decreasing the redox potential of the water principally by supplying thereto atomic hydrogen.

2 Claims, 6 Drawing Sheets

APPARATUS AND METHODS FOR REDUCING THE REDOX POTENTIAL OF SUBSTANCES

This is a continuation of application Ser. No. 08/121,264, filed Sep. 13, 1993, now abandoned.

FIELD OF THE INVENTION

The present invention relates to apparatus and methods for reducing the redox potential of substances and to various uses of such substances.

BACKGROUND OF THE INVENTION

It is well known that all biological systems live by undergoing oxidation and reduction reactions.

It is generally accepted that oxidation and the presence of an excess of hydroxyl free radicals produce degradation in certain biological systems in living organisms.

Specifically, scientific literature attributes certain cancers and other diseases such as Parkinsons disease to uncontrolled oxidation. Failure of the body's protective systems to quench the excess oxidizing free radicals leads to uncontrolled reactions resulting in such diseases.

It is known to improve water quality by electrolysis. A home unit for water improvement is manufactured and sold by Ange Systems, Inc. and distributed by Sanyo Trading Co., Ltd. in Tokyo, Japan and provides both acidic and alkaline water supplies. The acidic water is proposed for use in personal cleaning, to kill microorganisms, while the alkaline water is proposed for use as drinking water.

SUMMARY OF THE INVENTION

The present invention seeks to provide apparatus and methods for reducing the redox potential of substances and various uses of such substances.

It is appreciated that drinking water, especially chlorinated water, has a high concentration of oxidizing OH radicals expressed in high redox potential readings.

The present invention seeks to quench the hydroxyl free radicals by atomic hydrogen, to form water. The atomic hydrogen activity is provided via reducing water.

It is known that the active hydrogen in different antioxidants has different physical properties, such as its magnetic resonance, causing it to have different biological effects. Therefore, the hydrogen coming from a specific substance carries some characteristics of the substance it came from. It is also known that hydrogen atoms of a substance can be exchanged with hydrogen atoms in a solvent, such as water.

It is therefore another object of the present invention to form water in which one or more of the hydrogen atoms are of a predetermined character. In this manner, water can be improved qualitatively and quantitatively.

It is known that air oxidized by ozone, chlorine and the like is toxic to plants. The oxidative potential of the air stems from the formation of hydroxyl radicals upon reaction of the oxidizing matter with the moisture in the air and the water in the plants.

It is therefore another object of the present invention to reduce oxidizing fluids, such as air, by contact with atomic hydrogen or reducing water.

It is also an object of the present invention to provide a vehicle for preventing or slowing harmful oxidation in biological, organic and inorganic systems.

There is thus provided in accordance with a preferred embodiment of the present invention a method for improving water quality including the steps of:

providing a supply of water to be treated; and decreasing the redox potential of the water principally by supplying thereto atomic hydrogen.

Preferably, the step of decreasing the redox potential comprises supplying molecular hydrogen to apparatus operative to convert the molecular hydrogen to atomic hydrogen.

The step of decreasing the redox potential may include the step of electrolysis.

In accordance with a preferred embodiment of the present invention, the step of supplying includes the step of supplying molecular hydrogen to a porous material which is operative to disassociate the molecular hydrogen into atomic hydrogen and to adsorb the atomic hydrogen.

There is also provided, in accordance with a preferred embodiment of the present invention a method for improving water quality including the steps of:

providing a supply of water to be treated; and decreasing the redox-potential of the water by electrolysis employing a cathode and an anode, wherein water communicating with the anode and the cathode is not separated.

Additionally in accordance with a preferred embodiment of the present invention there is provided a method for improving water quality including the steps of:

providing a supply of water to be treated;

initially oxidizing the water; and subsequently reducing the redox potential of the oxidized water.

Further in accordance with a preferred embodiment of the present invention there is provided a method for quenching the oxidizing free radicals of a substance including the steps of:

providing a supply of electron donors which following electron donation become oxidizers; and providing a supply of a material rich in atomic hydrogen activity which immediately bonds with the oxidizers produced by electron donation so as to prevent the build up of a presence of oxidizers.

There is also provided in accordance with a preferred embodiment of the present invention a method for quenching the oxidizing free radicals of a substance including the steps of:

providing an anti-oxidant which is operative for producing reduction of the substance and which, upon producing reduction does not act as an oxidant.

Preferably the anti-oxidant is atomic hydrogen.

Preferably the porous material comprises a ceramic material, or a sistered material including a catalyst or graphite.

Additionally in accordance with a preferred embodiment of the present invention there is provided a method of improving air quality within an enclosure including the steps of:

reducing the redox potential of moisture in air to provide reducing air; and supplying the reducing air to the enclosure.

Further in accordance with a preferred embodiment of the present invention there is provided a method of improving air quality including the step of quenching oxidizing substances in the air.

Preferably, the step of quenching comprises the step of quenching hydroxyl free radicals in the air.

Additionally in accordance with a preferred embodiment of the present invention there is provided a method of storing produce including the steps of:

maintaining produce in a controlled atmosphere; and reducing the redox potential of the controlled atmosphere.

Further in accordance with a preferred embodiment of the present invention there is provided a method of growing plants including:

providing water having a redox potential;

providing a plant;

reducing the redox potential of the water to produce reduced redox potential water;

irrigating the plant with the reduced redox potential water.

Preferably the method of growing plants also includes the step of providing a spray of the reduced redox potential water thereby to provide a reduced redox potential atmosphere for the plant.

Additionally in accordance with a preferred embodiment of the present invention there is provided a method of soulless plant growth including the steps of:

providing water having a redox potential;

providing a plant;

reducing the redox potential of the water to produce reduced redox potential water;

providing the reduced redox potential water to the plant.

Preferably, the step of providing comprises the step of providing a water spray to the plant.

Further in accordance with a preferred embodiment of the present invention there is provided a method of reducing the redox potential of fluids including the steps of:

reduction of the redox potential of a liquid to produce a reduced redox potential liquid;

freezing the reduced redox potential liquid to produce frozen reduced redox potential liquid; and supplying the frozen reduced redox potential liquid to a fluid for reduction of the redox potential thereof.

Additionally in accordance with a preferred embodiment of the present invention there is provided a method for improving water quality including the steps of:

killing microorganisms in the water by oxidizing the water; and thereafter reducing the redox potential of the water.

Further in accordance with a preferred embodiment of the present invention there is provided a method of storing produce including the steps of:

providing a supply of water;

increasing the redox potential of part of the supply of water to provide oxidizing water;

reducing the redox potential of another part of the supply of water to provide reducing water;

humidifying air using the reducing water to produce reducing air;

washing produce using the oxidizing water;

thereafter rinsing the produce in the reducing water;

thereafter removing excess reducing water from the produce by directing a flow of the reducing air onto the produce; and thereafter maintaining the produce in a controlled atmosphere containing the reduced air.

Further in accordance with a preferred embodiment of the present invention there is provided a method of disinfecting a liquid including the steps of:

supplying molecular oxygen and hydrogen to the liquid to create an excess of OH radicals for disinfection; and thereafter supplying molecular hydrogen to the liquid to reduce the redox potential thereof.

Additionally in accordance with a preferred embodiment of the invention there is provided a method of operating a spa including the steps of:

heating, disinfecting and reducing the redox potential of water by applying thereto an AC electrical current which produces partial electrolysis thereof; and supplying the heated, disinfected and reduced water to a spa.

Further in accordance with a preferred embodiment of the present invention there is provided a method of providing a fluid with active hydrogen having selected characteristics including the steps of:

supplying hydrogen to a material having selected characteristics; and causing exchange of hydrogen atoms between the material and the fluid, whereby the fluid receives hydrogen atoms from the material, which hydrogen atoms have the selected characteristics.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
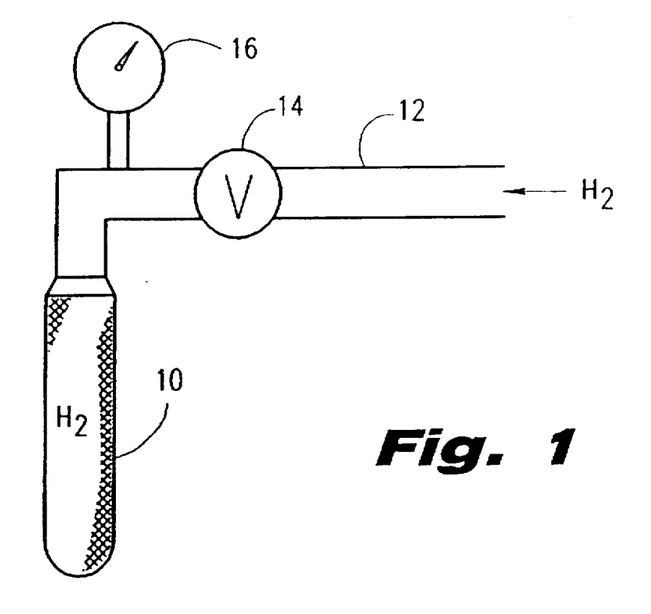
FIG. 1 is a simplified illustration of apparatus for supplying atomic hydrogen to a fluid.

Reference is now made to FIG. 1, which is a simplified illustration of apparatus for supplying atomic hydrogen to a fluid. The apparatus preferably comprises a porous ceramic tube 10, typically formed of alumina and which is commercially available from Coors Ceramic Company of Golden, Colorado, under catalog number AL 998-L3. Molecular hydrogen from any suitable source, such as a gas cylinder or an electrolysis device, is supplied to the tube 10, via a conduit 12. A valve 14 and a pressure indicator 16 may be provided along conduit 12.

The porous ceramic tube 10 is preferably operative to prevent substantial diffusion of molecular hydrogen therethrough, thereby retaining pressurized molecular hydrogen therewithin over a relatively long time, even when valve 14 is closed. Atomic hydrogen, however, does become absorbed in pores of the tube 10, communicating with the outer surface thereof.

By causing fluid, such as a gas, e.g. air, or a liquid, e.g. water or a hydrocarbon fuel, to flow past tube 10, atomic hydrogen is supplied to the fluid, thus reducing the redox potential thereof, i.e. increasing the hydrogen activity of the fluid. Typical reductions of redox potential may be from about +300 mv to −150 mv for water, gasoline and air.

Figure 2:
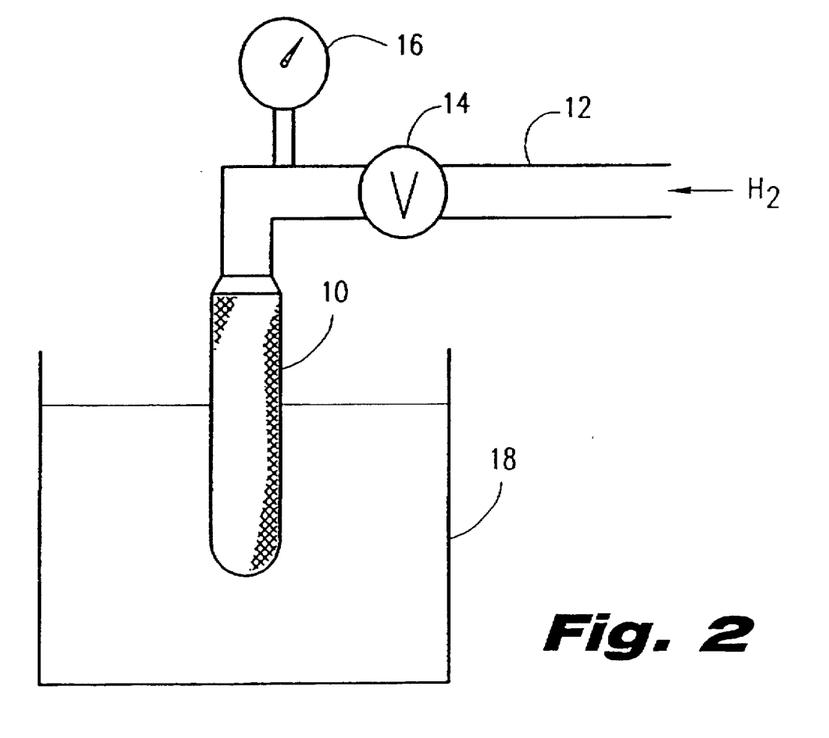
FIG. 2 is a simplified illustration of apparatus for reducing the redox potential of a liquid in accordance with one embodiment of the present invention.

Reference is now made to FIG. 2 which shows the apparatus of FIG. 1 in a bath 18 or conduit of a liquid. The liquid is preferably stirred or otherwise caused to flow past the tube 10, for reducing the redox potential of the liquid in accordance with one embodiment of the present invention.

Figure 3A:
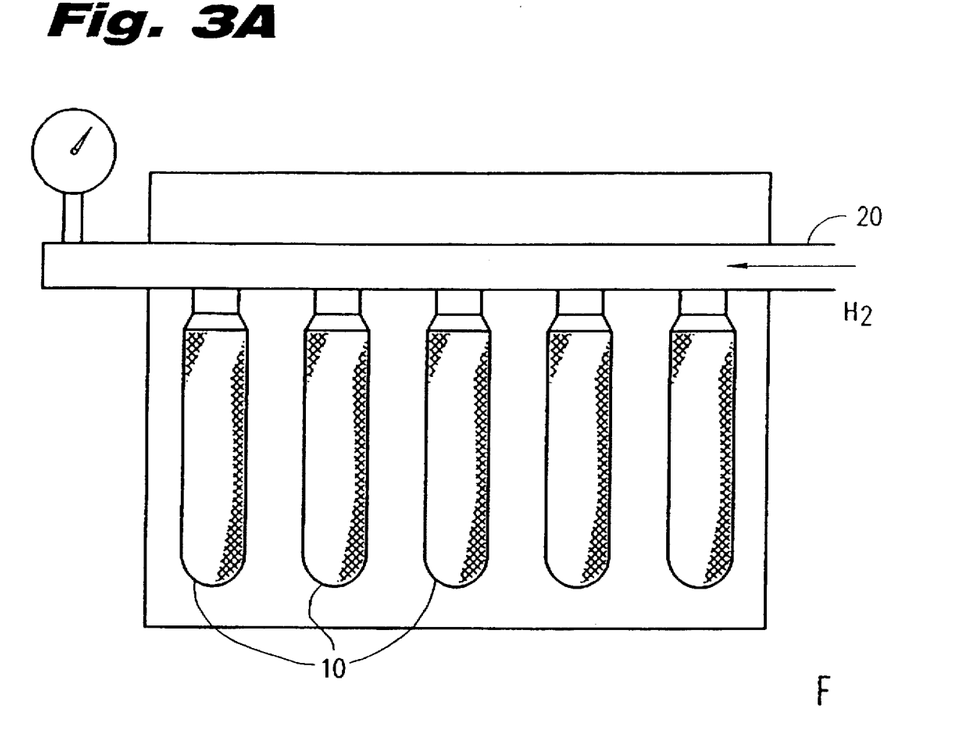
FIGS. 3A and 3B are simplified illustrations of apparatus for reducing the redox potential of a gas in accordance with one embodiment of the present invention.
Figure 3B:
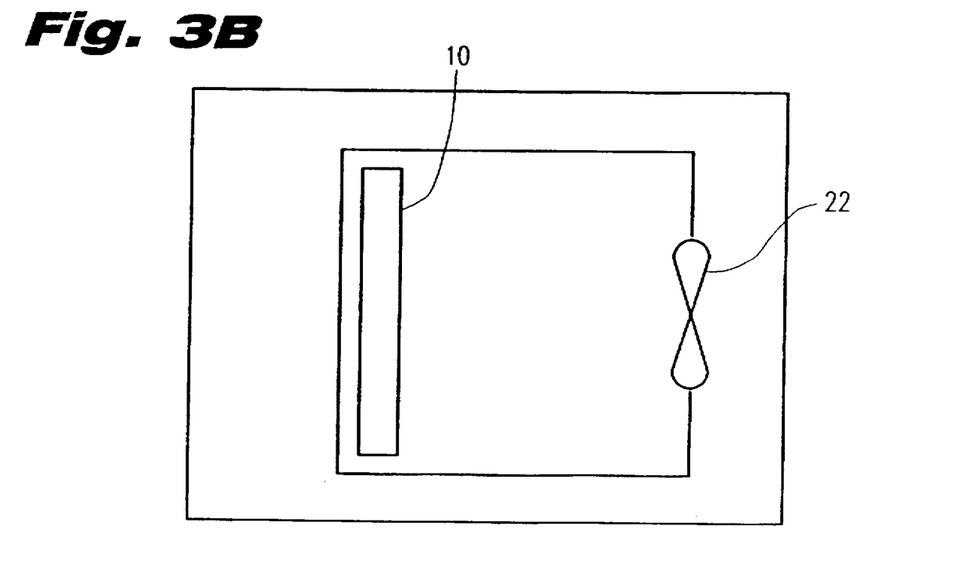

Reference is now made to FIGS. 3A and 3B, which are simplified illustrations of apparatus for reducing the redox potential of a gas in accordance with one embodiment of the present invention. It is seen that a plurality of tubes 10 are associated via a manifold 20 with a source of molecular hydrogen. A fan 22, or any other suitable device is provided for causing the gas to flow past the tubes 10. It is appreciated that the water vapor in the air picks up and reacts with the atomic hydrogen. In effect, the redox potential of the gas is thus reduced by reducing the redox potential of the liquid carried thereby.

Figure 4A:
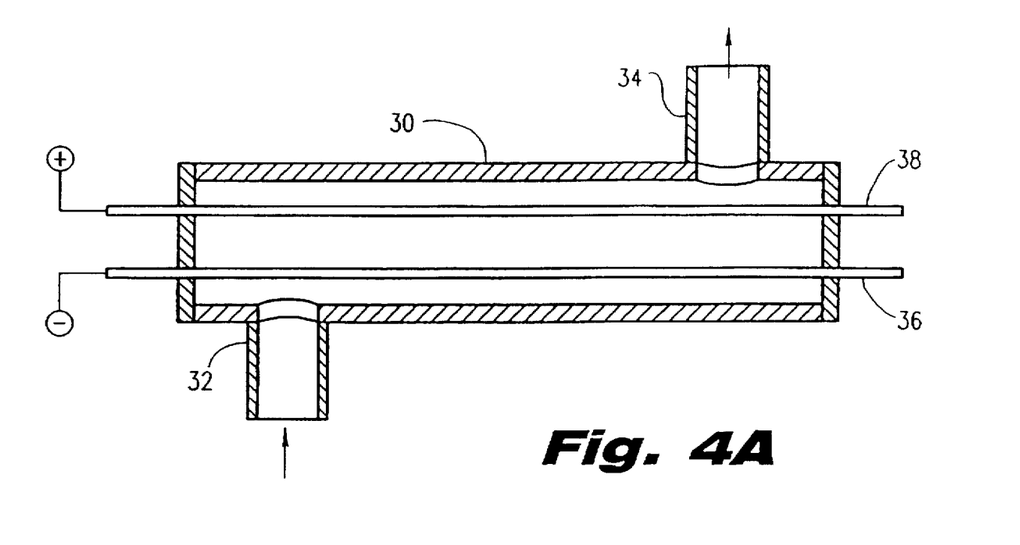
FIGS. 4A and 4B are simplified illustrations of apparatus for reducing the redox potential of a liquid in accordance with another embodiment of the present invention in two different variations.

Reference is now made to FIG. 4A which is a simplified illustration of apparatus for reducing the redox potential of a liquid in accordance with another embodiment of the present invention. A non-conductive housing 30 is provided with a liquid inlet 32 and a liquid outlet 34. A pair of respective negative and positive electrolysis electrodes 36 and 38 are located within the housing. By application of DC voltage across the electrodes 36 and 38, hydrogen is caused to be present on the negative electrode 36. This hydrogen is picked up by the liquid passing through housing 30. Oxygen and chlorine may be present on the positive electrode 38. Generally, the oxygen does not oxidize water. The chlorine strongly oxidizes the water by forming OH radicals. The net result, however, is reduction of the water.

Figure 4B:
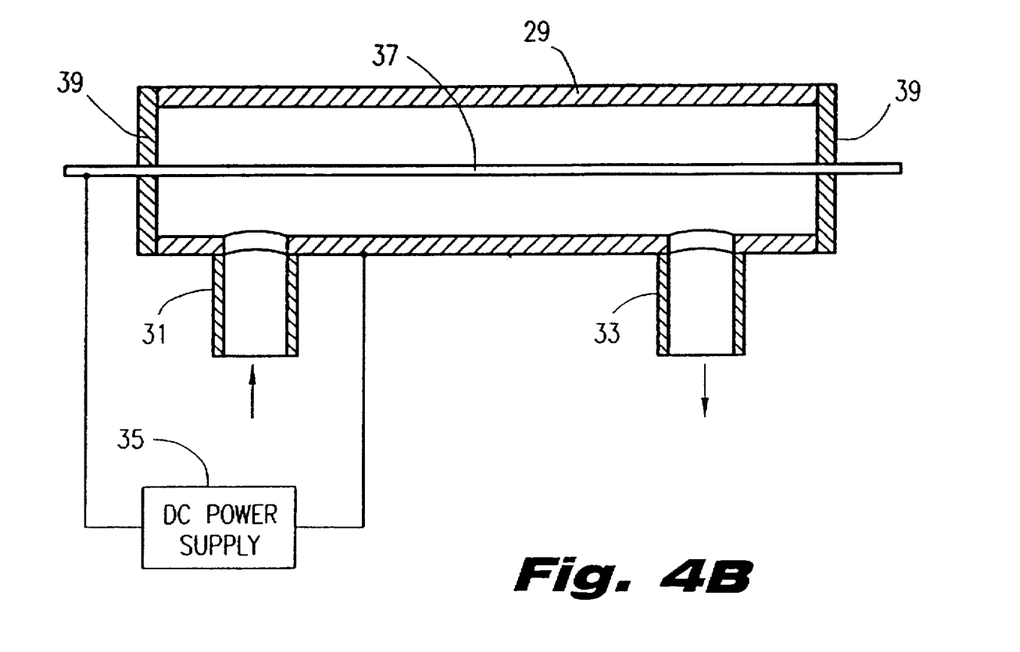

Reference is now made to FIG. 4B which is a simplified illustration of apparatus for reducing the redox potential of a liquid in accordance with yet another embodiment of the present invention. A housing 29 is formed of stainless steel pipe and is associated with a liquid inlet element 31 and a liquid outlet element 33. The housing 29 is coupled to the negative terminal of a DC power supply 35 and serves as a negative electrode.

Disposed preferably concentrically within housing 29 is a stainless steel rod or pipe 37 which is mounted by a pair of insulating mounts 39 and is coupled to the positive terminal of power supply 35. Rod or pipe 37 serves as the positive electrode.

By application of DC voltage across the electrodes 29 and 37, hydrogen is caused to be present on the interior surface of housing 29. This hydrogen is picked up by the liquid passing through housing 29. Oxygen and chlorine may be present on the positive electrode 38. Generally, the oxygen does not oxidize water. The chlorine strongly oxidizes the water by forming OH radicals. The net result, however, is reduced water.

Figure 5:
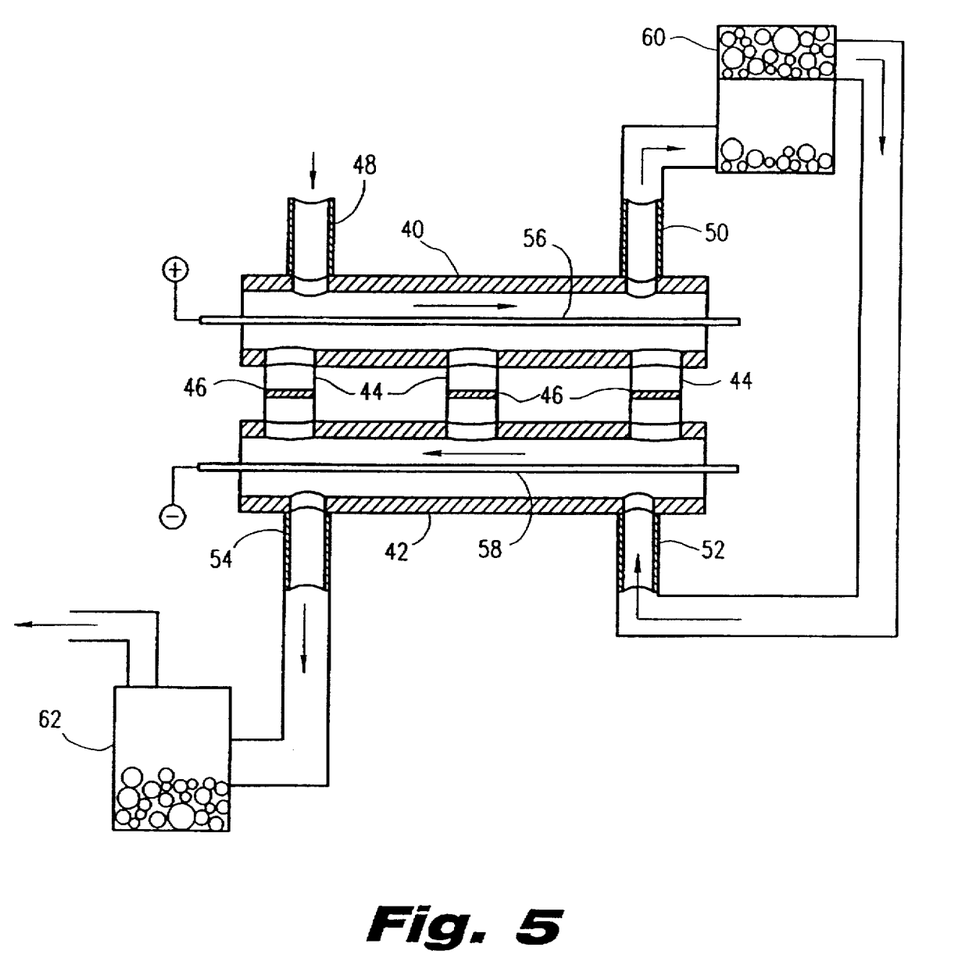
FIG. 5 is a simplified illustration of apparatus for reducing the redox potential of a liquid in accordance with still another embodiment of the present invention, wherein a liquid is first oxidized and then reduced.

Reference is now made to FIG. 5 which is a simplified illustration of apparatus for reducing the redox potential of a liquid in accordance with still another embodiment of the present invention, wherein a liquid is first oxidized and then reduced. The apparatus comprises a pair of non-conducting housings 40 and 42 which are interconnected by a plurality of non-conducting electrochemical bridges 44, each of which may include a porous ceramic barrier 46. Each of housings 40 and 42 includes a liquid inlet and a liquid outlet, indicated respectively by reference numerals 48, 50 and 52, 54. A positive electrolysis electrode 56 is disposed within housing 40, while a negative electrolysis electrode 58 is disposed in housing 42.

The apparatus of FIG. 5, which is particularly suitable for disinfecting water, operates by causing water to enter housing 40 via inlet 48 and to be oxidized by electrode 56. The oxidized water, downstream of electrode 58, is supplied to an oxidation enhancement chamber 60, typically filled with activated carbon and ceramic beads. Chamber 60 provides high surface contact and dwelling time to enable the full oxidation of the water by the oxygen and chlorine produced by the operation of the positive electrode 56 on water, thereby to kill microorganisms therein.

The thus disinfected water is then supplied via inlet 52 to housing 42 wherein it is reduced. The reduced water from housing 42 is provided to a reduction enhancement chamber 62, typically filled with activated carbon and ceramic beads. Chamber 62 provides high surface contact and dwelling time to enable the full reduction of the water.

Figure 6A:
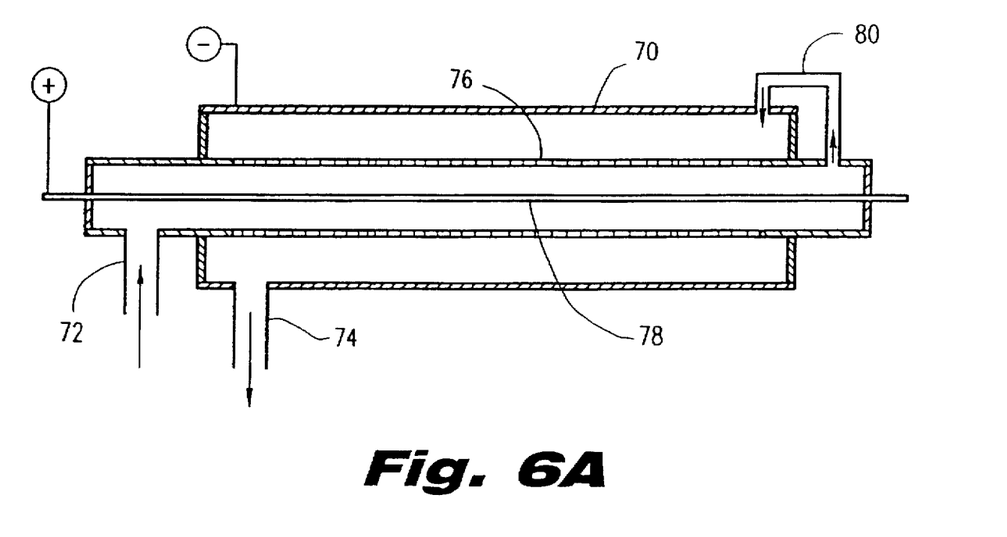
FIG. 6A is a simplified illustration of apparatus for reducing the redox potential of a liquid, wherein a liquid is first oxidized and then reduced in accordance with another embodiment of the invention.

Reference is now made to FIG. 6A which is a simplified illustration of apparatus for reducing the redox potential of a liquid, wherein a liquid is first oxidized and then reduced in accordance with another embodiment of the invention. Here a housing 70 is formed of a conductor, such as stainless steel and defines a negative electrolysis electrode. Housing 70 is formed with a liquid inlet 72 and a liquid outlet 74. Disposed within housing 70 is a tube 76 formed of a porous ceramic material, which may be identical to that used in tube 10 described hereinabove.

A positive electrolysis electrode 78 is disposed interiorly of tube 76, so as to oxidize liquid entering through inlet 72. The oxidized liquid passes along a conduit 80 to the interior of housing 70, outside of tube 76, where it is reduced by hydrogen formed on the interior surface of housing 70, which operates as a negative electrode. Reduced, disinfected liquid, such as water is output at outlet 74. Alternatively, the ceramic tube 76 may be replaced by a fabric hose or similar device, which does not permit significant passage therethrough of liquid but does permit passage therethrough of electrical current.

Figure 6B:
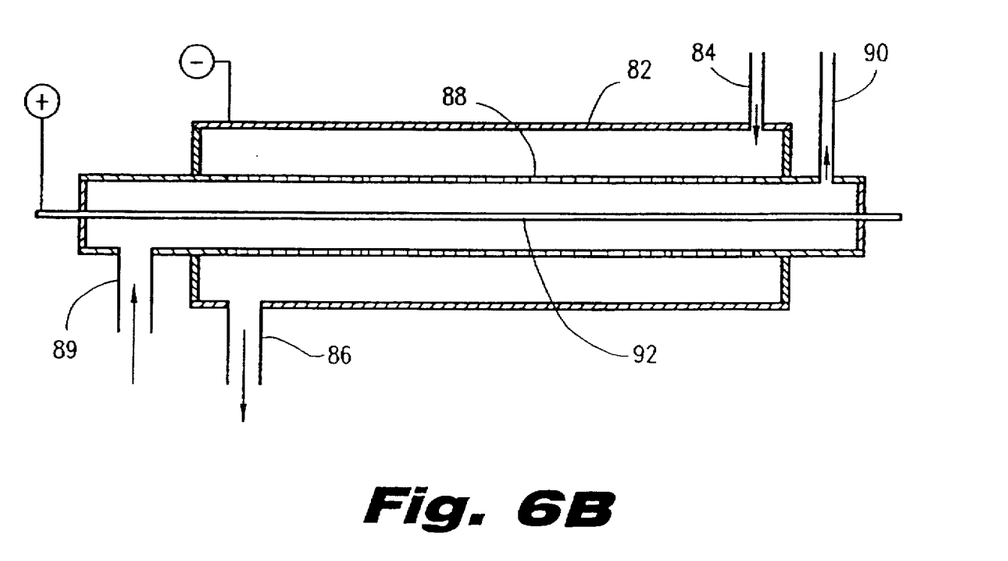
FIG. 6B is a simplified illustration of a variation of the apparatus of FIG. 6A providing separate reducing and oxidizing functions.

Reference is now made to FIG. 6B which is a simplified illustration of a variation of the apparatus of FIG. 6A for reducing the redox potential of a liquid, wherein a liquid is first oxidized and then reduced in accordance with another embodiment of the invention. Here a housing 82 is formed of a conductor, such as stainless steel, and defines a negative electrolysis electrode. Housing 82 is formed with a liquid inlet 84 and a reduced cathodic liquid outlet 86. Disposed within housing 82 is a tube 88 formed of a porous ceramic material, which may be identical to that used in tube 10 described hereinabove. Tube 88 is formed with a liquid inlet 89 and an anodic water outlet 90.

A positive electrolysis electrode 92 is disposed interiorly of tube 88, so as to oxidize liquid entering through inlet 89. The oxidized liquid passes out through outlet 90. Liquid entering via inlet 84 is reduced by hydrogen formed on the interior surface of housing 82, which operates as a negative electrode. Reduced, cathodic liquid, such as water, is output at outlet 86. Alternatively, the ceramic tube 88 may be replaced by a fabric hose or similar device, which does not permit significant passage therethrough of liquid but does permit passage therethrough of electrical current.

Figure 7:
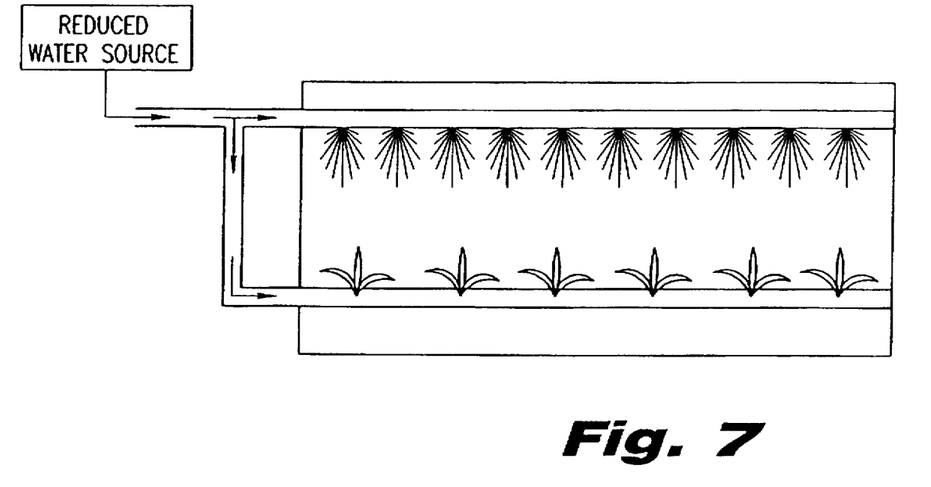
FIG. 7 is a simplified illustration of a growing enclosure including apparatus for reducing the redox potential of the interior atmosphere thereof in accordance with an alternative embodiment of the present invention.

Reference is now made to FIG. 7 which is a simplified illustration of a growing enclosure including apparatus for reducing the redox potential of the interior atmosphere thereof in accordance with an alternative embodiment of the present invention. It is seen that reducing water is employed not only for watering the plants, but also for spraying in the air, so as to reduce the redox potential of the interior atmosphere of the growing enclosure.

Figure 8:
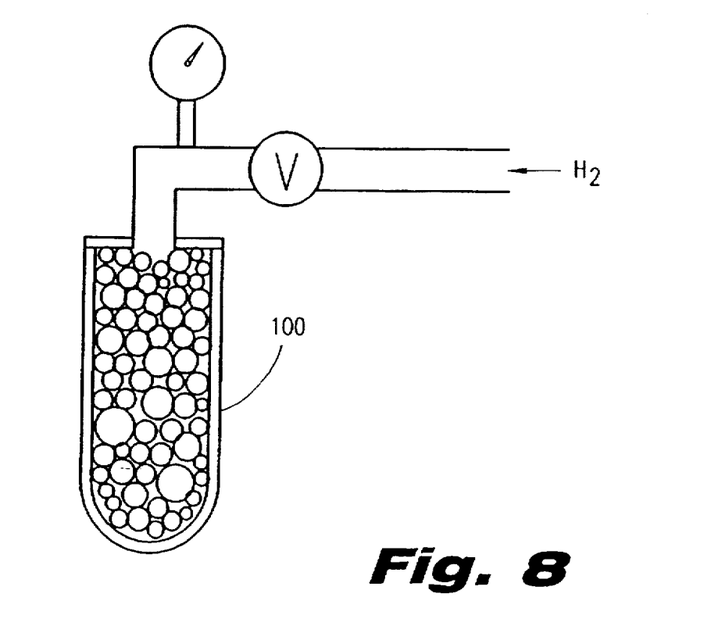
FIG. 8 is a simplified illustration of apparatus for producing fluids with characteristic hydrogen.

Reference is now made to FIG. 8 which is a simplified illustration of apparatus for characterizing hydrogen. Hydrogen is supplied to a container 100 typically formed of a porous ceramic material, such as that employed for tubes 10, described hereinabove. Disposed within container 100 is preferably a finely divided material, preferably an organic material or other active material which is a hydrogen donor, whose characteristics it is sought to obtain in atomic hydrogen. Hydrogen supplied to container 100 is exchanged with the hydrogen of the material contained in container 100 and the exchanged atomic hydrogen of the material collects on the outer surface of the container 100, so as to be able to be picked up by fluid, such as gas, or air, flowing therepast. The exchanged atomic hydrogen has characteristics of the material from which it was received, and thus, in effect contains information.

A number of examples of the invention will now be described:

EXAMPLE I—STRESS TOMATO PLANTS

Two sets of four trays of tomato plants were grown in a greenhouse in Patterson, Calif. The control tray was irrigated with well water whose measured redox potential was between 270 and 300 mv, while the test tray was irrigated with the same well water which had been treated using reducing equipment of the type illustrated in FIG. 4B. The measured redox potential of the test irrigation water was about 50 mv.

Both trays were not irrigated for three days. The lack of irrigation resulted in dehydration and browning of the plants in the control tray but did not result in browning or visible stress in the test plants.

EXAMPLE II—STRESS CAULIFLOWER PLANTS

Eight trays of cauliflower plants were grown in a greenhouse in Patterson, California. The control trays were irrigated with well water whose measured redox potential was between 270 and 300 mv, while the test trays were irrigated with the same well water which had been treated using reducing equipment of the type illustrated in FIG. 4B. The measured redox potential of the test irrigation water was about 50 mv. Both groups of trays grew normally for about three months and appeared to be identical.

Both sets of trays were not irrigated for three days. The lack of irrigation resulted in dehydration and browning of the plants in both the control trays and the test trays. Irrigation was then resumed as before. Most of the plants in the test trays returned nearly to their previous normal state, but none of the plants in the control trays revived.

EXAMPLE III—HIGH SALINITY STRESS CELERY PLANTS

Two identical beds of celery plants, each about 100 feet long and 12 feet wide and containing hundreds of thousands of plants, were grown in a greenhouse in Salinas, Calif. The control plants were irrigated with well water whose measured redox potential was between 270 and 300 mv, while the test plants were irrigated with the same well water which had been treated using reducing equipment of the type illustrated in FIG. 4B. The measured redox potential of the test irrigation water was about 50 mv.

Both groups of plants grew normally for about 6 weeks until salinity stress was noticed in the control plants. The salinity stress was expressed in yellowing of the control plants and damage to the roots of the control plants. No corresponding salinity stress was noticed in the test plants.

EXAMPLE IV—GROWTH AND VITALITY CAULIFLOWER PLANTS

Four trays of cauliflower plants were grown outdoors in Patterson, Calif. The control trays were irrigated with well water whose measured redox potential was between 270 and 300 mv, while the test trays were irrigated with the same well water which had been treated by boiling for two minutes and subsequent cooling to ambient temperature. The measured redox potential of the test irrigation water was about 100 mv. Both groups of trays grew normally for about one month and appeared to be identical.

Thereafter the control plants began to show signs of fatigue, loss of color, and susceptibility to attack by pests. The test plants did not show such fatigue or loss of color and showed less susceptibility to attack by pests.

EXAMPLE V—GROWTH AND VITALITY TOMATO PLANTS

Forty acres of tomato plants were grown in Five Points, Calif. Thirty-nine of the forty acres were irrigated with water whose measured redox potential was about 310 mv, while a control acre was irrigated with the same water which had been treated using reducing equipment of the type illustrated in FIG. 4B. The measured redox potential of the test irrigation water was about 45 mv. All plants were seeded in January, 1993. Irrigation began in April and proceeded for 8 hours once a week. Plants were harvested on Jul. 16, 1993.

Samples of fruit bearing plants were selected from both the control and the test acreage during harvest. The test plants were larger and heavier than the control plants. Although the number of tomatoes per plant was about the same for the control and test plants, the weight of the tomatoes in the test group was about 40% higher than that for the control group. The solid content, pH and other quality parameters were the same in both groups.

EXAMPLE VI—REDUCTION OF WATER BY ELECTROLYSIS

Well water at Patterson, Calif., having a redox potential of 312 mv was supplied to apparatus of the type illustrated in FIG. 4B at a rate of about 5 gallons per minute. The current was 20 Ampere and the voltage was 16 Volts. The water output had a measured redox potential of 45 mv. This water was supplied to a spa and was circulated therethrough and was also employed for irrigation.

EXAMPLE VII—REDUCTION OF WATER BY ELECTROLYSIS

Well water at Patterson, Calif., having a redox potential of 312 mv was supplied to apparatus of the type illustrated in FIG. 4B at a rate of about 5 gallons per minute. AC current was employed at 220 Volt. The water output had a measured redox potential of 45 mv. Operation of the apparatus of FIG. 4B using AC current provided heating of the water and disinfection thereof in addition to the reduction of the redox potential thereof. This water was supplied to a spa and was circulated therethrough and through the apparatus of FIG. 4B.

EXAMPLE VIII—REDUCTION OF WATER BY ELECTROLYSIS

Well water at Patterson, Calif., having a redox potential of 270 mv was supplied to apparatus of the type illustrated in FIG. 6A at a rate of about 1 gallon per minute. DC current was employed at 2 Amperes and a titanium electrode 78 was employed.

The water output had a measured redox potential of −50 mv.

EXAMPLE IX—REDUCTION OF WATER BY ELECTROLYSIS

Well water at Patterson, Calif., having a redox potential of 270 mv was supplied to apparatus of the type illustrated in FIG. 6B at a rate of about 1 gallon per minute. DC current was employed at 2 Amperes and a titanium electrode 78 was employed.

The water output at outlet 86 had a measured redox potential of 350 mv. The water output at outlet 90 had a measured redox potential of −460 mv.

EXAMPLE X—DECHLORINATION AND REDUCTION OF WATER BY ELECTROLYSIS

Well water at Patterson, Calif., having a redox potential of 270 mv was chlorinated with commercial chlorine solution. The redox potential of the chlorinated water was 690 mv. The chlorinated water was supplied to apparatus of the type illustrated in FIG. 6A at a rate of about 1 gallon per minute. DC current was employed at 2 Amperes and a titanium electrode 78 was employed.

The water output had a measured redox potential of 640 mv. This output was passed through an 8 inch long tube containing active carbon. The water output from the tube had a measured redox potential of −50 mv.

EXAMPLE XI—ICE CUBES OF REDUCING WATER

Hydrogen gas was bubbled into tap water using a sparger for about one minute. The measured redox potential of the tap water was reduced thereby from 295 mv to −50 mv. The thus reduced water was frozen into ice cubes and used subsequently in a variety of drinks. Melting of the ice cubes greatly reduced the redox potential of the drinks.

EXAMPLE XII—REDUCING WATER USING CERAMIC TUBE

Hydrogen was supplied under a pressure of 30 psi to a ceramic tube as illustrated in FIG. 2. Water was provided at a redox potential of 285 mv. Upon agitating the ceramic tube in the water, the redox potential of the water dropped to 85 mv.

EXAMPLE XIII—TRANSFER OF CHARACTERISTICS OF HYDROGEN

One gram of dry black pepper powder is placed in a ceramic tube as illustrated in FIG. 2. Hydrogen gas was supplied to the interior of the tube at a pressure of 25 psi. The water outside of the ceramic tube became slightly discolored and had a slight taste of pepper.

Part of the ceramic tube was left above the water line. Brown colored liquid droplets having a strong taste of pepper were found on the outer surface of the ceramic tube above the water line.

A control experiment identical to the foregoing but using nitrogen gas instead of hydrogen gas, produced none of the observed results.

EXAMPLE XIV—ENHANCEMENT OF HYDROCARBON FUEL

Hydrogen was sparged into regular unleaded gasoline. The redox potential of the gasoline was reduced from about 300 mv to −150 mv. This gasoline was employed in a lawnmower and an automobile and appeared to provide easier starting and more powerful operation.

It will be appreciated by persons skilled in the art that the present invention is not limited by what has been particularly shown and described hereinabove. Rather the scope of the present invention is defined only by the claims which follow:

I claim:

1. A method for improving the quality of and utilizing water comprising the steps of
   providing a supply of water to be treated; and
   decreasing the redox potential of the water principally by supplying thereto atomic hydrogen which is not accompanied by any other substance; and also comprising the step of irrigating plants with water following decreasing of the redox potential thereof.

2. A method according to claim 1 and also comprising the step of providing a spray of water following decreasing the redox potential thereof, thereby to provide a reduced redox potential atmosphere for the plants.

* * * * *